US007087865B2

(12) United States Patent
Lerner

(10) Patent No.: US 7,087,865 B2
(45) Date of Patent: *Aug. 8, 2006

(54) HEAT WARNING SAFETY DEVICE USING FIBER OPTIC CABLES

(76) Inventor: William S. Lerner, 215 E. 68th St., Apt. 23A, New York, NY (US) 10021-5729

( * ) Notice: Subject to any disclaimer, the term of this patent is extended or adjusted under 35 U.S.C. 154(b) by 0 days.

This patent is subject to a terminal disclaimer.

(21) Appl. No.: 11/042,716

(22) Filed: Jan. 24, 2005

(65) Prior Publication Data

US 2006/0081602 A1    Apr. 20, 2006

Related U.S. Application Data

(62) Division of application No. 10/967,039, filed on Oct. 15, 2004.

(51) Int. Cl.
*H05B 3/68* (2006.01)
(52) U.S. Cl. .................. 219/445.1; 219/446.1
(58) Field of Classification Search ............ 219/443.1, 219/445.1, 446.1, 447.1, 448.11, 448.12, 219/448.19, 460.1, 461.1; 340/640, 641, 340/642; 385/100, 115, 116, 123
See application file for complete search history.

(56) References Cited

U.S. PATENT DOCUMENTS 1,692,012 A    11/1928  Wells
2,710,274 A    6/1955   Kuehl
3,590,371 A    6/1971   Shaw
3,701,344 A    10/1972  Walls et al.
3,796,884 A    3/1974   Tricoire
3,827,301 A    8/1974   Parker
3,893,340 A    7/1975   Parker
4,032,687 A    6/1977   Hornsby
4,390,275 A    6/1983   Schilf et al.

(Continued)

OTHER PUBLICATIONS

Robax Glass, www.robaxglass.com/prop/htm, Applied Energy Systems Inc., Jul. 22, 2004.

(Continued)

*Primary Examiner*—Sang Paik
(74) *Attorney, Agent, or Firm*—Steven Horowitz

(57) ABSTRACT

Heat alert safety device for warning individuals that a surface is hot wherein a fiber optic cable runs from an electric light source to a heat warning symbol. The cable has a plurality of fibers connected at a first end thereof to the light source and transmits light from the light source beginning from the first end to the second end of the cable and shines light out of the second end of the cable to a predetermined symbol adjacent the second end of the cable. The symbol is readily visible when illuminated to an observer who can also readily see the surface and the symbol communicates that the surface of the stove, in particular, the heating element, is dangerously hot. A controller controls the light source Whenever a specified surface temperature is reached, the symbol is lit and remains lit as long as said specified surface temperature is maintained.

17 Claims, 4 Drawing Sheets

U.S. PATENT DOCUMENTS

| | | | |
|---|---|---|---|
| 446,455 | A | 5/1984 | Noshawaty |
| 4,805,188 | A | 2/1989 | Parker |
| 4,891,250 | A | 1/1990 | Weibe et al. |
| 5,013,893 | A | 5/1991 | Goessler et al. |
| 5,144,112 | A | 9/1992 | Wyatt et al. |
| 5,153,563 | A | 10/1992 | Goto et al. |
| 5,441,344 | A | 8/1995 | Cook |
| 5,499,597 | A | 3/1996 | Kronberg |
| 5,750,959 | A | 5/1998 | Plumptre |
| 5,809,680 | A | 9/1998 | Scheidler et al. |
| 5,997,964 | A | 12/1999 | Klima |
| 6,057,529 | A | 5/2000 | Kirby |
| 6,104,007 | A | 8/2000 | Lerner |
| 6,639,190 | B1 | 10/2003 | Lerner |
| 6,700,100 | B1 | 3/2004 | Lerner |
| 6,806,444 | B1 | 10/2004 | Lerner |

OTHER PUBLICATIONS

LED Lighting Products, http://members.shaw.ca/sagelighting/led_spotlights_and_bulbs_specifi.htm, Sage Lighting Ltd., Jul. 22, 2004.

Borofloat Glass, http://www.us.schott.com/whitegoods/, Schott North America Inc. Jul 22, 2004.

All About Fiber Optics, www.us.schott.com/fiberoptics/english/allaboutfiberoptics.html, Schott North America Jul. 22, 2004.

Kristall's Acrylic Rods' with Fiber-optic halogen source, Lyx.com, Jun. or Jul. 2004, Unidentified Magazine in the Home Decorating.

Robax, Product Information Release 0016 Schott North America Inc.

Psst. This is your Sensor. *Grapes are thirsty*, By Barnaby Feder, The NY Times, Jul. 26, 2004, page C2.

Whirlpool Built—in electric ceramic cooktops, Whirlpool, Mar. 1997.

Magic Chef electric cooktop 8670RV & 8770RB Maytag, 1997.

Dacor's "Touch Top" cooktops, Dacor, Jan. 1997.

Dacor electric convertible cooktops, Dacor, May 1997.

CE built—in electric cooktop model CE Profile JP 350BV, Summer 1997.

HEAT WARNING SAFETY DEVICE USING FIBER OPTIC CABLES

PRIORITY INFORMATION

This patent application is a divisional patent application of U.S. patent application Ser. No. 10/967.039 previously filed by Applicant and Inventor William S. Lerner on Oct. 15, 2004 and which is incorporated herein by reference in its entirety.

FIELD OF THE INVENTION

The field of this invention is heat warning safety devices, and more particularly, such devices for warning individuals that a surface is dangerously hot.

BACKGROUND OF THE INVENTION AND DISCUSSION OF THE PRIOR ART

With respect to stoves and related appliances, various kinds of stoves—electric, gas, smooth cooktop stoves which use glass or metal tops—and toaster ovens are well known to be used for heating food. In addition, "mobile stove-type appliances" such as hot plates and warming trays are well known to be used for heating food. Each of these kinds of stoves and "mobile stove-type appliances" present a safety problem since the heating elements of the stove are hot during the cooking process and remain hot well afterwards. During the cooking process, the safety problem caused by touching the heating element is mitigated somewhat by visual inspection of the stove. With a gas, electric or smooth top stove, for example, the presence of a pot or other utensil on top of the stove might alert someone to the fact that the stove appears to be in use for cooking and therefore too hot to touch. Even the presence of a pot or other utensil is not a reliable clue, however, since people tend to leave tea kettles on their stove perpetually. When the cooking process has ended, however, it is generally impossible to detect that the heating elements of the stove remains hot and would burn the skin of anyone who touched them. There is no visual or other clue that the stove is hot.

To some degree, adults have developed an inherent caution when approaching stoves because of their experience and knowledge in dealing with such safety problems. This inherent caution, however, does not obviate the need for a device that warns the adult when touching the stove would be dangerous. Moreover, children, and particularly young children, usually have not developed such a watchfulness and there has long been a need for a device that can prevent burn accidents to children who may inadvertently touch a stove that is hot, especially when the stove remains hot well after the cooking process has ended.

Furthermore, the reduction in the size of modern kitchens has led the occupants of modern apartments to make use of the stove as an extension of the counter top adjacent the stove as a resting places for large items that have been carried into the kitchen area. An example of such items is heavy bags of groceries brought into the kitchen. There is an urge to set the bags down on the nearest flat surfaces, which may be the top of a stove adjacent a counter top. This is particularly true for those stoves that are smooth on top, such as smooth cooktops. In general, the top surfaces of modern kitchen stoves are increasingly flat, especially the top surfaces of smooth cooktops. These factors have only increased the danger to adults when the top surfaces of stoves are used as a resting place for packages, such as groceries brought into the kitchen.

Smooth cooktop stoves presently are also dangerous if touched on their top surface when they are still hot, even after use. These smooth cooktop stoves, or "smoothtops" as they are sometimes called, utilize as the heating element separate areas on the top surface of the stove (at the same location that gas stove would have burners) which are made of glass. Under each area, usually circular, is a strong light source, such as a halogen lights. The light source projects the light upward to the surface area of the smoothtop's heating element—the glass area on the top surface of the stove. Since the glass area is coated on its bottom with a dark coating, when the light strikes it, the heat from the strong light is absorbed by the glass area and these glass surfaces form each heating element of the stove.

Another variation of the smooth cooktop is the use of a "ribbon heating element" where the smooth glass surface is heated by a coiled electric circuit called a "ribbon element" just underneath it instead of by a halogen light source. The heat is transmitted directly upward so that only the heat element itself gets hot and the rest of the cooktop surface remains cool. In some cases, the ribbon heating element also has another feature whereby the heating element is made of two concentric circles so that the option exists of two sizes of the heating element to match the two different sizes of the pans that need to be heated. This new technology does not solve the problem of warning adults and children that the heating element should not be touched when the cooking process has ended. If anything, it generates the additional hazard that someone can be lulled into touching the heating element after thinking the heating element is cool since the surface right adjacent to it is indeed cool.

Some of these problems have been addressed in Applicant's U.S. Pat. No. 6,104,007 and in pending patent applications, through use of heat warning safety devices that includes a warning symbol that appears directly on the heating element of a stove and by using thermochromic compositions such as for inserts or overlays. Thermochromic materials include liquid crystal (whether cholesteric, chiral nematic or another kind) compositions or leuco dyes that change color when passing through a given temperature range, and such compositions are now familiar to consumers from their frequent use in inexpensive items, like temperature indicating forehead thermometers or stick-on aquarium thermometers.

Presently, in order to address the danger of touching a hot "smoothtop" stove, such stoves generally have several light indicators, each one corresponding to each heating element, all located in small one rectangular area on the surface of the cooktop. The light indicators remain lit for a certain length of time after the stove's heating element is turned off in order to deter someone from touching the heating element when it is still hot, although "off". The light indicators themselves consist of a "dot" or red LED or other indicator, each dot corresponding to a different heating element. Unfortunately, this attempt to address the danger of touching a hot stove of the smooth cooktop variety is insufficient as a warning system (putting aside the fact that the light indicators as an indicator of residual heat after the heating element is turned off are presently designed only for the smooth cooktop variety stoves to begin with and not for gas and electric coil stoves).

A quick glance at the group of light indicators would not be sufficient to warn the average adult, no less children or the elderly, that a particular heating element is too hot. This is because the group of light indicators do not immediately tell someone which heating elements correspond to which light indicators. At a minimum, several seconds of concentration are needed in order to determine from the light indicators that are "on", which heating elements are too hot to touch. Many adults, and certainly most children, cannot afford those seconds of deduction since their desire to touch the stove is immediate. In addition, an adult carrying groceries into the kitchen and looking for a counter top to place them on or a child running into and playing in the kitchen are even less likely than the average adult or child to take the time to engage in a several second thinking process. Accordingly, the child or the adult will be inadequately warned about the danger of being burned. With this in mind, it is no surprise that a 1997 industrial design exhibit at the Cooper Hewitt (Smithsonian) in New York demonstrated that over 69% of adults can not match the control knob with its corresponding burner (i.e. heating element) on a stove.

Furthermore, the prior art heat indicators can be up to three feet away from the heating element to which they correspond. That distance is too far away for a dangerously hot surface. Surely one would not position a warning for an open air shaft three feet away.

Moreover, the use of a single red LED dot to communicate a warning of heat, while it may have been noticeable and effective in the kitchen of the past, is completely ineffective today. In today's kitchen environment, the meaning of a dot of a red LED is dramatically diluted by the presence of a multitude of dots of red LED's all over the place in the modern sophisticated kitchen. For example, many appliances in the kitchen such as coffee pots, cell phones, corded phones, answering machines, computers, televisions, rechargeable flashlights, personal digital assistant devices, dustbusters, alarm keypads and motion sensors all have red lights or red LED's which dilute the meaning of a single red LED as an indicator of heat on a near by heating element.

There is also confusion of message from the prior art light indicators. In the electric stove the light goes off when the electric coil is turned off and no residual heat indicator exists. Light "off" means there could still be a danger of heat. In the smooth cooktop the light indicator does stay on when the heating element residually remains hot after being turned off. In this context light "off" means no dangerously hot surface. Thus the red light indicator means two different things depending on the context and this confuses the consumer and dilutes the effectiveness of the indicator lights as warnings.

The above problems with existing heat indicators are even more pronounced when considered in the context of today's modern kitchen. The traditional kitchen in the past has been the domain of a stay at home mother. The kitchen contained one corded telephone and a cooktop stove would be plainly obvious and salient in such a kitchen. Today's kitchen is much more distracting. In today's kitchen, it is more common, at least in many households, for everyone to cook. Furthermore, the kitchen itself in many cases functions also as an entertainment room, a living room or a family room. The kitchen and its inhabitants feature cordless telephones, computers announcing "you have mail", cell phones, pagers and people milling about "multi-tasking", talking, drinking, socializing and not just cooking. Guests may be unfamiliar with cooking areas. Smoothtop stoves are not so distinctive in this environment since they have been re-designed to blend into the kitchen design. For example, a shiny black glass smoothtop stove may blend in amongst shiny black granite kitchen counter tops. Smoothtops are also not immediately recognizable as smoothtops because the new designs are odd in shape. Also, where previously versions had a vent hood that stuck out, such vent hoods are now often built into the cabinet and remain unseen, thus eliminating the visual cue telling you it is a cooking area. Furthermore, stoves appear in islands in the middle of the kitchen separate from any oven rather than against the wall and adjacent the oven. Hence, a potentially hot surface can be approached from four different directions in a distracting environment when the danger may be hard to recognize it is not hard to see that the prior art indicators which appear on only one side of a cooktop stove, are practically useless in today's kitchen, even putting aside the fact that they require precious seconds of deduction to figure out which dangerously hot heating element it is supposed to correspond to the lit indicator warning light. It takes approximately one second of exposure to a 167 degrees Fahrenheit surface for the average adult to receive a burn (and a lower temperature for children and elderly, who have thinner skin).

In addition, some people may not have grown up with smooth cooktops and may not recognize it. The elderly, children, visually impaired individuals would all have trouble using prior art heat warning indicators on a smoothtop to warn against the residual heat of a heating element on a smoothtop stove, or for that matter other stoves or hot surfaces.

Heat alert safety devices based on thermochromic compositions situated in the center of each heating element and containing a predetermined warning symbol which changes color at a specified temperature has been discussed in Applicant's previous patents and patent applications, including U.S. patent application Ser. No. 09/788,594 filed Feb. 21, 2001 and U.S. patent application Ser. No. 10/429,111 filed May 2, 2003 and the aforementioned U.S. Pat. No. 6,104,007 to Lerner These devices offer many important advantages. One potential drawback, however, is that devices based on thermochromic compositions are limited to heat environments in which the thermochromic composition is reliable at color changing and is stable. Furthermore, a thermochromic composition does not instantly change color but changes color somewhat gradually. Thermochromic compositions are harder to see in the dark or poorly lit room.

Although LED's may contain certain advantages over thermochromic composition when used in heat warning devices, to the extent that the hot surface is the hot surface of a smooth cooktop stove or of a gas stove, any heat warning device that requires electricity near the heating element to activate the warning symbol can be inappropriate. In the case of a gas stove, for example, the desired location for the warning device is in the center of the burner, which requires the path of any electric wiring to an LED to cross the gas lines. Since gas is combustible, it is undesirable to have an electric current near it. Moreover, with respect to an electric stove having a serpentine electric coil as the heating element, running a new set of electric wires to feed a set of LED's functioning as the warning symbol runs the risk of electromagnetic interference between the different currents. LEDs cannot withstand excessive temperatures, and excessive vibrations could shake wires and electrical connections and/or disable LED bulbs. Furthermore, with respect to smooth cooktop stoves, the heating element is formed by having a smooth area of glass or metal on the surface of the stove subjected to a heat source directly underneath that smooth area, for example a halogen lamp. Insulated electric wires running near the halogen lamp or other source of heat could be dangerous since smoothtop stoves can get as hot as 800 degrees Fahrenheit or higher (1200 to 1400 degrees) in some cases.

Outside the context of kitchens, heat warning devices also have numerous industrial applications. A factory worker working near a very hot liquid in a drum, a kiln, performing smelting or operating with machinery that gets very hot. Execssively cold temperatures also require temperature warning devices in industrial settings.

Consequently, there is a compelling need for a heat warning device that offers a heat warning symbol in an effective manner and in a manner that overcomes the disadvantages of the prior art. It is further desirable to have such a device with a heat warning symbol that does not require running an electric current near the heat warning symbol. Since the heat warning symbol itself necessarily has to be near a strong source of heat and in certain cases a combustible gas or an electric current, it is preferable to have a device that does not require running any electric current near the heat warning symbol. The present invention offers the above compelling advantages and many more advantages.

Preliminarily, moreover, it is noted that the present invention is applicable to many industrial surfaces. Purely by way of example, the following facilities or objects have surfaces that may very well need to warned with respect to dangerous heat: commercial ovens for baking, pizza ovens, candle manufacturing facilities, glass manufacturers, ceramic manufacturing facilities including kilns used to bake porcelain, power plants including electricity generating stations, commercial barbecue grills and smokers, crematoria, boiler rooms in commercial and residential buildings and water craft, oil and gas burners, metal casting plants, engines, such as jet engines, steam powered freight train engines, transformers, commercial coffee makers, industrial coffee roasters, glass melting facilities, recycling facilities, hot surfaces of objects used in the processing of chemicals including toxic chemicals, foundries, all kinds of refineries (metal to steel, etc.).

The device of the present invention is obviously also applicable to stoves and related appliances, and to any other surface that one may need to be warned that it is hot, as long as it has access to a light source that can be activated under predetermined conditions. For example, there are numerous devices whose surfaces become hot and remain hot even after the device has been shut off either electrically or otherwise. For example, a radiator cap becomes hot and remains hot for a period when the vehicle and radiator are shut off. Also, any kind of piping that is a conduit for hot liquids is an example of a surface that one may need to be warned that it is hot. Other devices having hot surfaces include hot surfaces on fireplace doors, flat irons, chafing dishes, coffee urns, heating pipes, home radiators, glue guns, oven doors, portable heaters of the electric, oil and ceramic disc type, kerosene lamps, kerosene heaters, barbecue grills of the electric, gas or charcoal type, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, synthetic braid trimmers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, home and commercial cappucino and espresso makers, autoclaves used to sterilize instruments in a medical setting, movie projectors, industrial steam machines and pressers, the metal surfaces in the cooking areas on an airplane, heat producing generators and many other such hot surfaces. These and other hot surfaces are exposed to children, maintenance works and ordinary adult users.

SUMMARY OF THE PRESENT INVENTION

A heat warning device for warning that a surface of an object is dangerously hot is presented wherein a fiber optic cable having a plurality of fibers surrounded by a protective sheathing runs from an electric light source controlled by a controller. The plurality of fibers at a first end of the cable adjacent the light source transmit light to illuminate a predetermined warning symbol adjacent the side of the cable, on the protective sheathing of the cable as a cut-out, at a long spaced interval from the second end of the cable or anywhere else. The illuminated heat warning symbol is visible to an observer who sees that the surface is dangerously hot. Whenever a specified surface temperature is reached, the symbol is lit and remains lit as long as said specified surface temperature is maintained. Alternatively, the cable transmits to a screen facing a second end of the cable an image of the symbol positioned between the light source and the first end of the cable.

It should be noted that the device of the present invention can be seen in the dark. This is significant since sometimes people cook or entertain in their kitchen in the dark. For example, when warming a bottle for an infant in the middle of the night, the parent may rely only on the nightlight of 15 Watts and use electric appliances in the dark kitchen.

IMPORTANT OBJECTS AND ADVANTAGES

The following important objects and advantages of the present invention are:

(1) to provide a heat warning device that illuminates a predetermined warning symbol and uses fiber optic cables;

(2) to provide such a device wherein the predetermined warning symbol may be located outside the cable;

(3) to provide such a device wherein the predetermined warning symbol may be located on a side of the cable;

(4) to provide such a device wherein the predetermined warning symbol may be located on the protective sheathing of the cable as a cut-out;

(5) to provide such a device wherein the predetermined warning symbol may be located on a coating of the protective sheathing as a cut-out;

(6) to provide such a heat warning device wherein the predetermined warning symbol is located on a light receiving medium or "screen" at a large interval from a second end of the fiber optic cable;

(7) to provide such a device using fiber optic cables that is suitable for situations where the target location of the potentially dangerously hot (or cold) surface may move (8) to provide such a device using fiber optic cables wherein a worker or user wearing such a cable can easily adjust the fiber optic cable or an end of such cable so that it shines toward facing the target surface that might become dangerously hot;

(9) to provide such a device wherein the intervening interval between the cable and the predetermined warning symbol contains a very hot environment;

(10) to provide such a device that is particularly useful in warning factory workers or kitchen workers of the fact that a liquid is dangerously hot;

(11) to provide such a device that can effectuate an image transfer of the predetermine symbol from an area adjacent the light source to a light receiving medium outside the cable;

(12) to provide such a device in which a light traversing medium is in the form of a perpendicular plane that contains the heat warning symbol;

(13) to provide a heat warning device using fiber optic cables using multiple light sources, one at each of multiple ends of the cable, or multiple light sources at one end, in case one light source malfunctions;

(14) to provide a device to warn of excessively cold temperatures that uses fiber optics and is physically the same as the device that has been described in the context of excessively hot temperatures;

(15) to provide a heat warning device that can be used inside a liquid, including water;

(16) to provide a heat warning device that is able to instantly be illuminated whenever a specified temperature is reached;

(17) to provide such a device that can be adjusted in brightness (and power) depending upon the type of people likely to need the warning of being dangerously hot;

(18) to provide such a device that is reliable and stable in a wide range of extreme temperature levels in its environment, for example from minus 400 degrees Fahrenheit to 1400 degrees Fahrenheit for cables made from Robax® glass-ceramic;

(19) to provide such a device that is reliable in a harsh chemical environment;

(20) to provide such a device that can be used to warn that a surface of a gas stove may be dangerously hot wherein the fiber optic cable can run through or run adjacent to the gas inlet lines;

(21) to provide a heat warning safety device using a fiber optic cable that is smaller and lighter than electric wires;

(22) to provide a heat warning safety device that is not combustible;

(23) to provide a heat warning safety device that can be better used with electrical appliances since the device is immune to electromagnetic interference;

(24) to provide a heat warning safety device that can be used on electric stoves without using electric wires;

(25) to provide a heat alert safety device that combines visual and auditory cues to maximize warning impact;

(26) to provide a heat warning safety device that allows a person to instantly recognize which hot surface is dangerously hot and needs to be avoided;

(27) to provide a heat alert safety device that alerts people that a surface is dangerously hot even when the heat source that caused the surface to be hot has been turned off;

(28) to provide a heat warning device that is easy to manufacture and can be easily integrated into the manufacturing of known stoves;

(29) to provide a heat warning device that includes a heat warning symbol, which is the most important part of the device, that appears directly on the potentially hot surface, whether that surface be in an industrial or home setting;

(30) to provide a heat warning safety device that is effective for children, adults, the elderly and visually impaired individuals, for one thing because it makes use of sound warnings;

(31) to provide such a heat warning safety device that can be readily seen and be effective in the dark;

(32) to provide such a heat warning device that is particularly useful in difficult conditions such as high temperatures, combustibility areas with excessive vibrations, areas with sudden movements;

(33) to provide such a temperature warning device that form a warning line surrounding a potentially hot area to warn of entry into an area containing dangerously hot surfaces;

(34) to provide a heat warning device using fiber optic cables so that if one of the fiber optic cable is damaged, it can be cut off and the remainder forms a new end without losing functionality, in contrast to LEDs.

DETAILED DESCRIPTION OF THE PREFERRED EMBODIMENT

Figure 1:
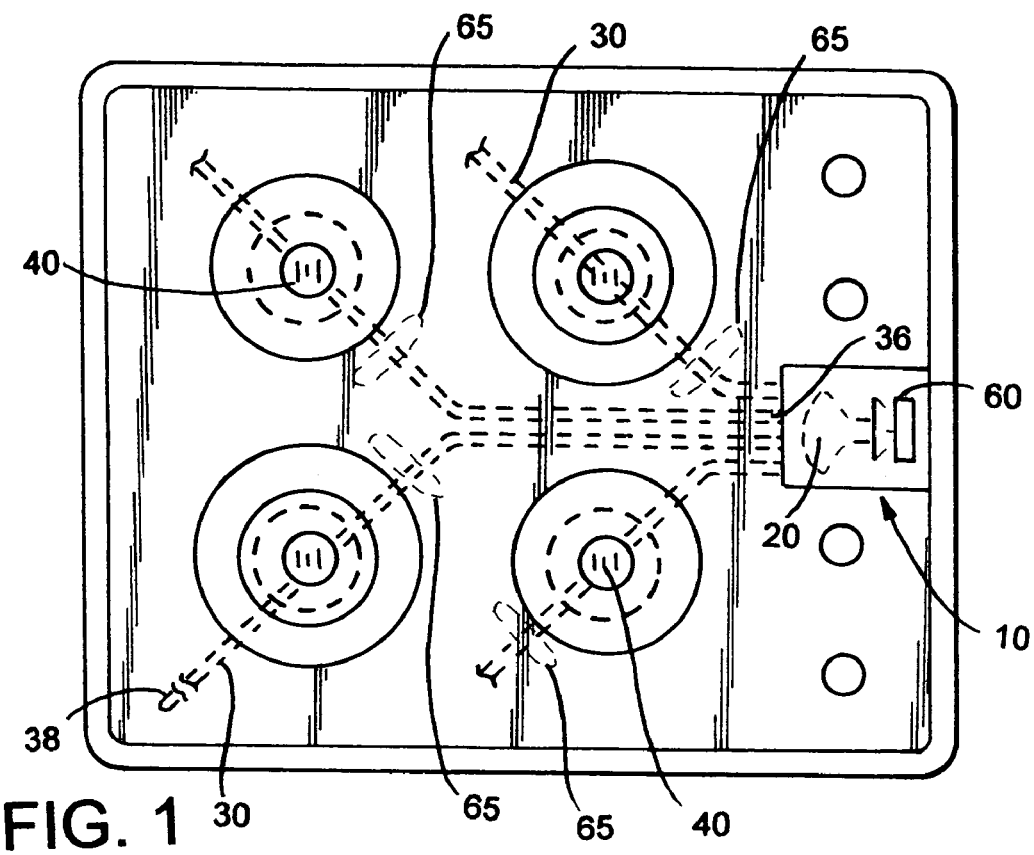
FIG. 1 is a top plan view of the heat warning safety device of the present invention used on a smooth cooktop stove with the heat warning symbol on a side of the cable.
Figure 2:
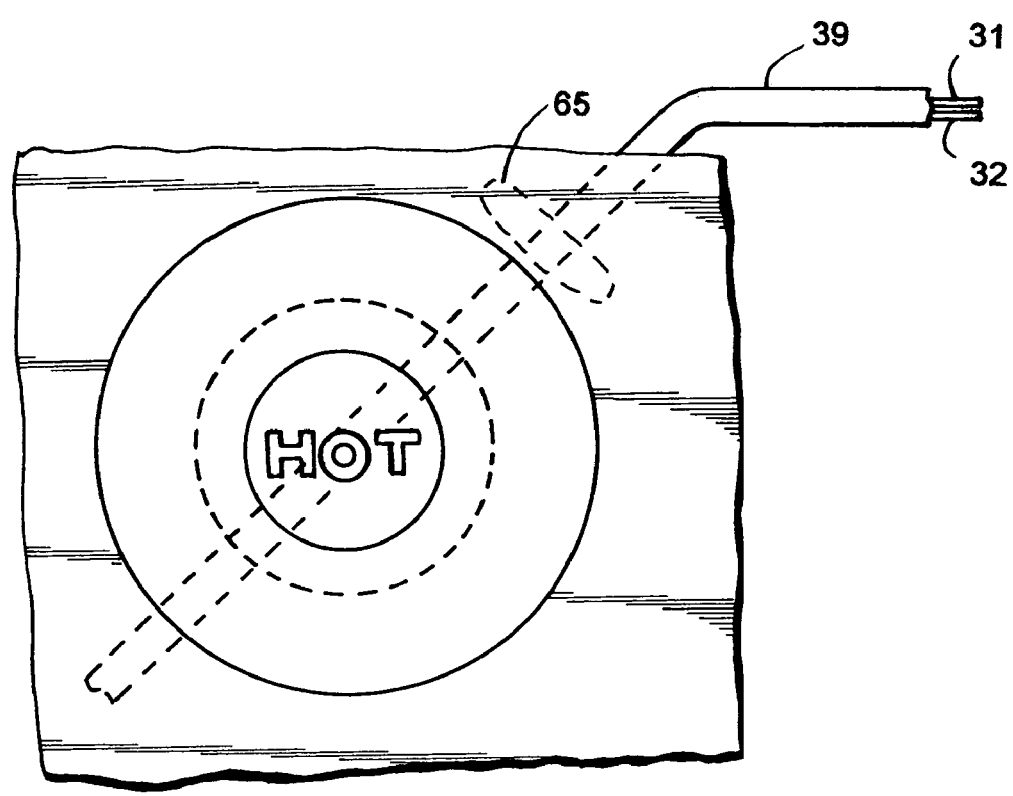
FIG. 2 is an enlarged fragmentary plan view of the heat warning safety device of the present invention used on a smooth cooktop stove with the heat warning symbol on a side of the cable.

The apparatus of the present invention will now be illustrated by reference to the accompanying drawings. The device of the present invention has been assigned reference numeral 10 Other elements have been assigned the reference numerals referred to below.

As seen from FIGS. 1–11, a heat alert safety device for warning individuals that a surface on an object is dangerously hot is presented. The device 10 includes a light source 20 that generates a light beam and includes a light guide. As shown in the drawings herein, the light guide is in the form of a fiber optic cable 30 formed of a plurality of fibers 31, 32, 33, 34, 45 etc. that is connected at a first end 36 of the fiber optic cable 30 to the light source 20 and oriented so that the plurality of fibers 31, 32, 33, 34, 35, etc. are directly in a path of the light beam. The fiber optic cable 30 transmits the light beam from the light source 20 beginning from the first end 36 of the fiber optic cable 30 to the second end 38 of the fiber optic cable. The second end 38 of the fiber optic cable 30 shines the light beam our of the cable 30.

Fiber optic cables in general are well known, including for interior lighting, although not for the use described in the present invention to the best of Applicant's knowledge. Fiber optic cable 30 consists of a collection of glass or optical fibers 31, 32, 33, 34, 35 etc. Presently, known technology generally relies on fibers in the cable 30 that are hair thin. The present invention, however, is not limited to a particular thickness fiber in the cable 30. Future technology my employ thicker fibers. Furthermore, military applications can readily be foreseen in which the efficiency advantages of using thin fibers may be overridden by the military power of using thick fibers.

The cable 30 also includes protective sheathing 39 that surrounds the fibers 31, 32, 33, 34, 35 etc. ("etc." is not intended to indicate that such reference numerals reach the number 36). In an alternative embodiment, protective sheathing 39 is present and surrounds fibers 31, 32, 33, 34, 35 etc. at only a portion of the length of fiber optic cable 30. Light traveling through the plurality of fibers 31, 32, 33, 34, 35, etc. is internally reflected. In accordance with well known fiber optic technology, fibers 31, 32, 33, 34, 35 etc. typically consist of a core with a high refractive index and a cladding with a lower refractive index so that the light rays are guided along the core by total internal reflections at the core/clad interface.

In accordance with certain embodiments of the present invention, however, for example FIG. 3, FIG. 4, FIGS. 5A–B, FIG. 6, FIG. 7, FIG. 8, although the light transmitted through cable 30 from first end 36 of cable 30 is internally reflected through fibers 31, 32, 33, 34, 35, etc. of cable 30, the light travels only a portion of the length of cable 30 before being directed or allowed to escape cable 30 through the side, for example through protective sheathing 39 of cable 30, at some point or area of cable 30 that is short of the second end 38 of cable 30. This requires use of special arrangement of fiber optic technology well known to those in the art. For example, it is believed that optical fibers lacking any cladding can be employed to accomplish this, or any other suitable technology well known to those in the art is employed. For example, the use of this fiber optic cables with light exits or emanates from the side of the fiber optic cable is known to be used in swimming pool lighting. For example, at www.fiberstars.com/pool & spa the Pool & Spa Division of a company called Fiberstars describes itself as the "world's leading manufacturer of fiber optic lighting for pools, spas and backyard landscapes" and this Division uses fiber optic cables in pools to produce lighting where the light shines out of the side of the cables. The fiber optic cable 30 is enclosed in opaque plastic until the cable reaches the point of the actual pool where it circles the pool and light escaping from the cable creates a continuous line surrounding the pool. Swimming pool illumination using fiber optic cables can span ninety feet or more.

By making use of light being shined out of the fiber optic cable 30, it is thereby possible to also employ the fiber optic cables of the heat warning device to surround an area containing dangerously hot surfaces to warn against entry into this area. In this case symbol 40 of the present invention, in communicating that the target surface is excessively hot, illuminates a border to warn against entry into an area in which the surface is located. For example, an electric generating station may contain a turbine generator in a room and when the turbine generator malfunctions the entire outer surface of the generator can become exceedingly hot. Thus, cordoning off the area in which the turbine generator is located becomes necessary since touching it is too damaging. Thus, fiber optic cables embedding under the floor to display a linear barrier that warns against entry of the area is accomplished using the present invention.

As noted fiber optic cable 30 includes plurality of optical fibers 31, 32, 33, 34, 35, etc. that are made of glass or other suitable material not yet known. Schott Glassworkes manufactures a transparent glass-ceramic called Robax® that has thermal endurance far exceeding that of normal tempered glass. While normal tempered glass is limited to applications that do not exceed 500 degrees Fahrenheit, Robax® is designed to operate at temperatures ranging from minus 400 degrees Fahrenheit up to plus 1400 degrees Fahrenheit Except for the alternative embodiment discussed below, fiber optic cable 30 may have any of various cross-sectional shapes that are suitable for fiber optic cables including round, square, rectangular, triangular, oval and others.

In one preferred embodiment of the present invention, light source 20 is an electric light source. It is, however, contemplated by the present invention that a light source other than an electric light source can be used as the light source 20. In one preferred embodiment, light source 20 is an LED (light emitting diode) bulb or bulbs. LEDs are brighter and longer-lasting than incandescent bulbs and use less energy, as explained in detail in an article in the Home Section of the Oct. 7, 2004 The New York Times. Furthermore, the time it takes to turn on the LED bulb is significantly less than for incandescent bulbs. In the present invention, the quicker the heat warning symbol is illuminated the better.

Light source 20 may be a collection of LED bulbs in order to better concentrate the light that has to be transmitted through fiber optic cable 30. Typically, the collection of LED's would be all together at, near or facing the same end 36 of cable 30. However, in certain embodiments, light source 20 may actually be a plurality of light sources. For example light source 20a is at, near or facing first end 36 of cable 30 and light source 20b is at, near or facing second end 38 of fiber optic cable 30. Furthermore, light source 20c may be at, near or facing a portion of cable 30 other than an end, i.e. a side, of cable 30. Alternatively, two or more light sources may be at first end 36 and none at second end 38. In general, the present invention contemplates the range of possibilities as to the position and amount of light sources in relation to the location of cable 30.

In a preferred embodiment which is the simplest case, light source 20 is located at or near or facing a first end 36 of fiber optic cable 30.

In one preferred embodiment, a predetermined heat warning symbol 40 is located adjacent the second end 36 of the fiber optic cable 30. The heat warning symbol 40 is readily visible when illuminated to an observer who can also readily see the surface. In a preferred embodiment, the heat warning symbol 40 is not visible at all or very much when not illuminated. Thus the illumination communicates information to the observer. When illuminated, the heat warning symbol communicates that the surface is dangerously hot.

Examples of heat warning symbols include the letters "HOT" or equivalents letters in a foreign language, or any other immediately recognizable symbol of dangerous heat.

Figure 10A:
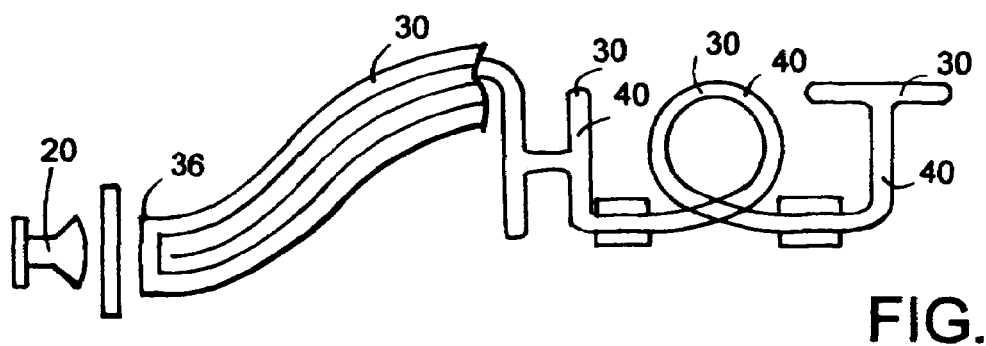
FIG. 10 is a side view of an alternative embodiment of a fiber optic cable of the present invention in which a portion of the cable is shaped in the form of a heat warning symbol.
FIG. 10B is a side view of a further alternative embodiment of a fiber optic cable of the present invention in which an end of the cable is shaped in the form of a heat warning symbol.
Figure 10B:
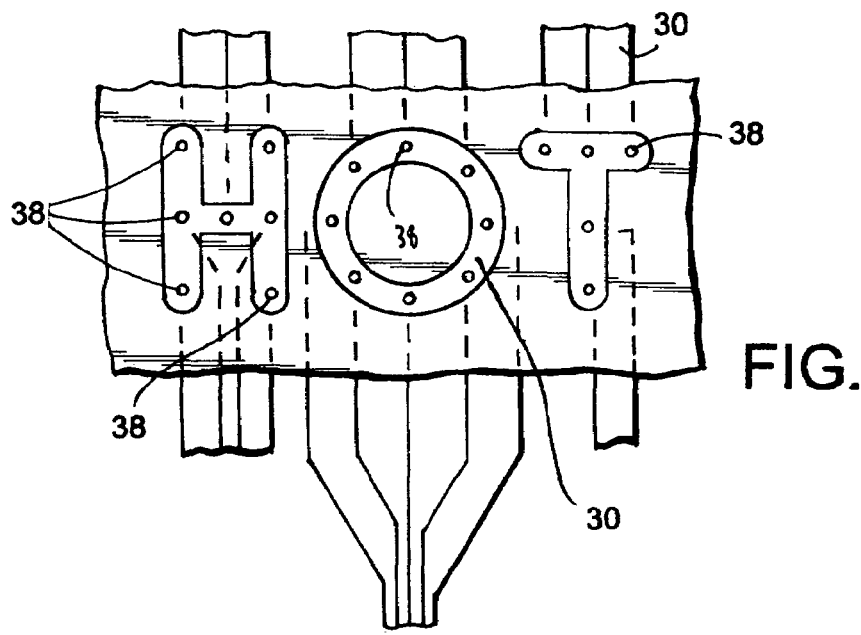

In an alternative embodiment shown in FIG. 10B, the second end 38 of the fiber optic cable 30 is itself shaped in a form of a predetermined warning symbol 40. The second end 38 of cable 30 simply terminates beneath a smooth glass (or metal) surface on a top surface of the stove and the symbol 40 is visible beneath when light source is illuminated since the second end 38 of cable 30 is illuminated in a particular shape. The surrounding area would be dark and an observer would only see the second end 38 shaped in the form of heat warning symbol 40 such as the letters "HOT" In the preferred version of this alternative embodiment, by observing second end 38 of cable 30 through the glass of the stove, the observer would be observing the cross-section of cable 30, which would have a shape in the form of the symbol itself. Whether the remainder of cable 30 is similarly shaped so that the cross section of cable 30 remains constant would be optional. Alternatively, cable 30 has its normal cross-sectional shape (i.e. circular, oval or other cross-section) except at second end 38 of cable 30 which second end 38 is shaped to conform to a heat warning symbol 40.

In a second version of the alternative embodiment just described, as shown in FIG. 10A, the fiber optic cable 30 is itself shaped in a form of a predetermined warning symbol 40 but not just at its second end 38. The cable 30 winds and turns to form the letters, shape or other indicator of the predetermined heat warning symbol 40 almost like a neon sign. The fact that the cable 30 itself is shaped in the warning symbol, or at least a portion of cable 30, further enhances the visibility of the symbol 40. In this embodiment, the non-lettering portion of cable 30 is the only area of cable that is not illuminated. The remaining portion is the lettering and is seen from a side view of cable 30 using the well known fiber optic technology described above.

Device 10 also includes a controller 60 controlling the light source 20 in a manner that whenever a specified surface temperature of the surface being warned against is reached, the heat warning symbol is illuminated and remains illuminated as long as the specified surface temperature is maintained. The controller could be or could include a computer chip or any other suitable component or thing including hardware or software that tells the light source to go on when a specified temperature is reached. Controller 60 would be located in a preferred embodiment near light source 20. In any event, controller 60 would be located distant from the heating elements or the potentially dangerously hot surface. In one embodiment, controller 60 could be housed in the same compartment or box as light source 20 and sound producing source 24 (described below)

Figure 6:
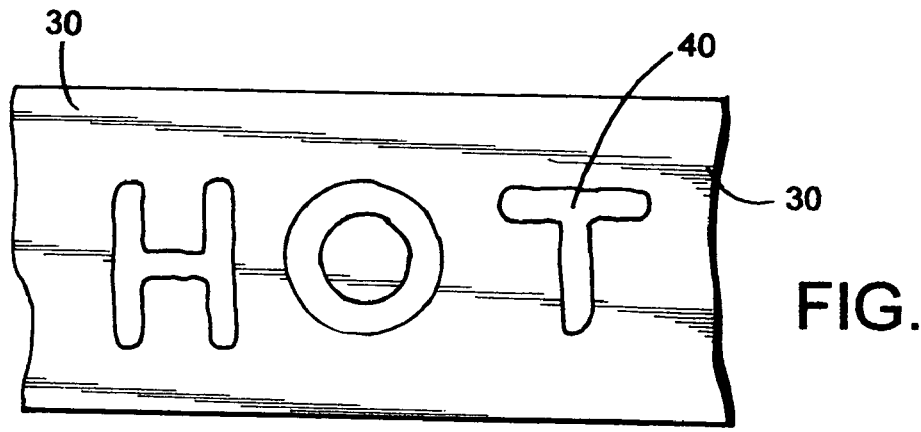
FIG. 6 is a cross-sectional view taken along line 6—6 of FIG. 5A.
Figure 11:
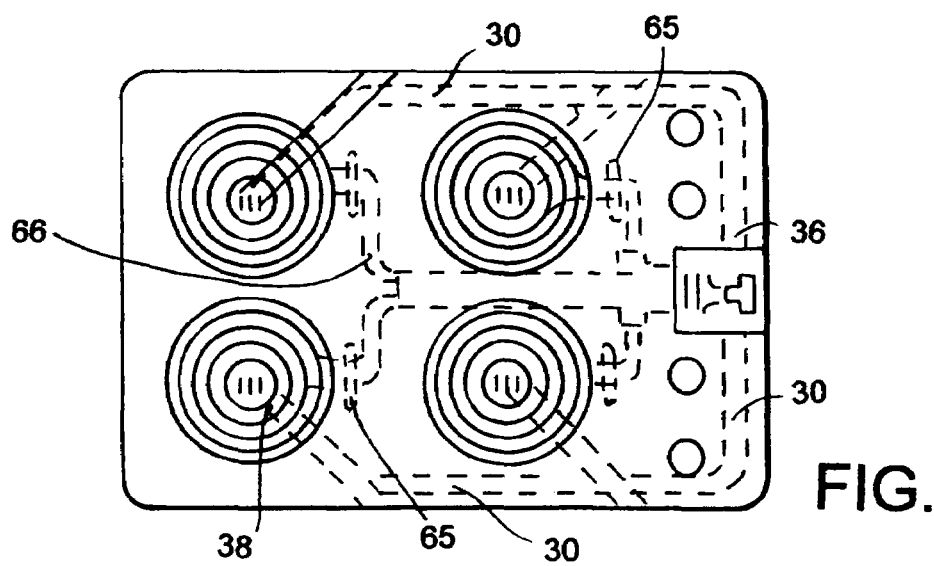
FIG. 11 is a top plan view of a heat warning safety device of the present invention used on an electric stove.

Controller 60 would receive information about the temperature of the heating element in a manner well known in the art. Presently, heat indicators in the shape of a dot of LED poorly positioned on the stove or other surface operate by receiving information about the temperature of the heating element or other surface and then they convert that information into an LED that is lit. In the present invention, for example, as best seen in FIGS. 5–6, there could be heat sensors 65 adjacent each heating element that is connected by wire to the controller distant from the heating elements. Heat sensor 65 ascertains the surface temperature, for example, the temperature of a heating element, and communicates that temperature to the controller 60. Heat sensor communication lines 66 are shown in FIG. 11. Note that although heat sensors 65 and heat sensor communication lines 66 are included in the embodiments shown in FIGS. 1–2, they have been omitted from the views in these embodiments.

In a preferred embodiment, heat sensor 65 employs wireless technology and does not need any communication lines. Dresser Instruments, a company located in Stratford, Conn., makes wireless temperature sensors and gauges. The advantages of wireless sensors are the reduced cost and the greatly improved set-up speed (hours versus days). According to a Jul. 26, 2004 recent article on page C2 of The New York Times, analysts estimate that 80% of the cost of setting up sensor networks is the cost of wiring them.

In another application of the present invention using wireless technology, a concierge on the ground floor of an office building watches a display panel that contains fiber optic cables therein rather than LED bulbs. The controller 60 receives signal indicating the presence of heat in an office from heat sensor 65 located in any office in the building. When the specified temperature is reached, the display panel lights up with a warning concerning a potential fire in that office suite.

In a case where the surface that is being warned against is the heating elements surface of a stove (for example a gas stove, an electric stove, or a smooth cooktop stove) or the area of the top surface of a stove where the heating elements are located, then typically, although not necessarily, the light source would also be located on the top surface of the stove as far removed from the heating elements as possible. In one embodiment, the light source would be near the control knobs of the stove.

In a preferred embodiment, the second end 38 of the fiber optic cable 30 is oriented so as to shine light at the heat warning symbol in a direction perpendicular to the top surface of the stove on which the heating elements appear This would presumably maximize illumination of the heat warning symbol 40 using the minimum amount of electric power. The present invention, however, contemplates any orientation of the second end 38 of fiber optic cable 30 that suffices to illuminate heat warning symbol 40.

It is known that fiber optic cables should be protected from ultra violet radiation which degrade the fiber and affect its longevity. It is contemplated by the present invention to protect cable 30 from UV radiation either using the standard Lexan® tubing a special PVC-type jacketing. However, in a preferred embodiment, the present invention contemplates filtering out UV radiation using a special glass-ceramic panel called Ceran® made by Schott HomeTech North America, which is located in Louisville, Ky. Ceran® is used on millions of cooktop stoves. A clear version of Ceran® is called Robax®. Robax® is highly transparent and therefore appropriate for the top surface of smooth cooktop stoves yet according to Schott HomeTech, Robax® is an effective filter to ultra violet radiation since it nearly blocks all wavelengths below 400 nm. Accordingly, the mere use of Robax® as the top surface of the smooth cooktop would render unnecessary any special UV filtering mechanism for cable 30 in the context of a cooktop stove.

Device 10 may also include switch 90 that is accessible to a user. In a preferred embodiment switch 90 is located on the object containing the surface that the heat warning symbol 40 is warning may be dangerously hot. Switch 90 is used to turn the heat warning safety device 10 on or off, for example by tuning the light source 20 itself on or off. Switch 90 can also have a timer associated therewith so as to have the device 10 on or off at certain predetermined periods.

Device 10, in certain embodiments, also includes a device indicator 80 that notifies the user whether device 10 is functional and can be relied on. If device 10 includes switch 90 then in certain embodiments device indicator 80 would be go on when switch 90 is turned on provided light source 20 is also functional. Alternatively, device indicator 80 is not affected by switch 90 but is a permanent indicator that independently changes indication mode whenever light source 20 becomes nonfunctional and needs to be replaced or adjusted. Hence, a user knows whether to rely on device 10.

The following are typical placements of the light source 20 for kitchen-related appliances, which are by no means the main focus of the present invention. In addition, even for these applications, other placements are well within the spirit of the present invention. When the object is a stove and the surface on the top of the stove where the heating elements are is the surface that may be dangerously hot, light source 20 is typically located immediately beneath a portion of a top surface of the stove at a maximum surface distance from the heating elements of the stove. If the stove is a gas stove and the target surface is a surface of a heating element on the gas stove, the heat warning symbol 40 may be positioned in a center of the heating element and the second end 38 of fiber optic cable 30 may be is positioned beneath the heating element. In a gas stove the heating element is a metal grate having an open area in the center of the metal grate. Alternatively, the warning symbol may be located in a line surrounding the entire stove top, grill or griddle. In an electric stove the surface is a surface of a heating element on an electric stove, heat warning symbol 40 may be positioned in a center of the heating element and second end 38 of the fiber optic cable 30 may be positioned beneath an area of the heating element. For an electric stove the heating element is a serpentine electric coil. In certain embodiments, the device can include a disk 45 in the center of the coil wherein the heat warning symbol 40 is positioned on the disk.

Where the object is a smooth cooktop stove and the surface is a surface is of a heating element of the smooth cooktop stove, symbol 40 may be positioned in a center of the heating element and second end 38 of the fiber optic cable 30 may be positioned beneath an area of the heating element. In a smooth cooktop the heating element is a smooth area of glass or metal on a top surface of the stove that absorbs heat from a heat source directly underneath the smooth area of glass or metal.

In certain embodiments, for example where the dangerously hot surface is the heating element of smooth cooktop stove the symbol 40 may be positioned surrounding the heating element. See for example, FIG. 9A of U.S. Pat. No. 6,104,007 to Lerner incorporated herein by reference. In that case, second end 38 of fiber optic cable 30 may be positioned beneath an area of the heating element—either beneath the heating element or beneath the symbol 40.

It should be noted in general that second end 38 of cable 30 need not be immediately adjacent heat warning symbol 40. It need only be close enough to illuminate heat warning symbol 40. Accordingly, the fact that a halogen lamp or other heat source may be positioned underneath the heating element of a smooth cooktop stove is not a factor that interferes with the placement of device 10 and in particular with the placement of the second end 38 of cable 30.

The present invention specifically contemplates a number of embodiments in which the predetermined warning symbol 40 of heat is located at a point other than adjacent second end 38 of fiber optic cable 30. For example, heat warning symbol 40 may be located on the side of fiber optic cable 30 whether or not said symbol 40 is adjacent to said side. Thus, fiber optic cable 30 transmits the light beam through the plurality of fibers of cable 30 and through a side of cable 30, i.e. through protective sheathing 39, to a point outside the fiber optic cable 30 by exiting the side of the cable 30. In certain embodiments, protective sheathing 39 is translucent or opaque to maximize the transmission of light through said protective sheathing 39. It is understood that protective sheathing 39 may be of any suitable material known in the art.

Figure 3:
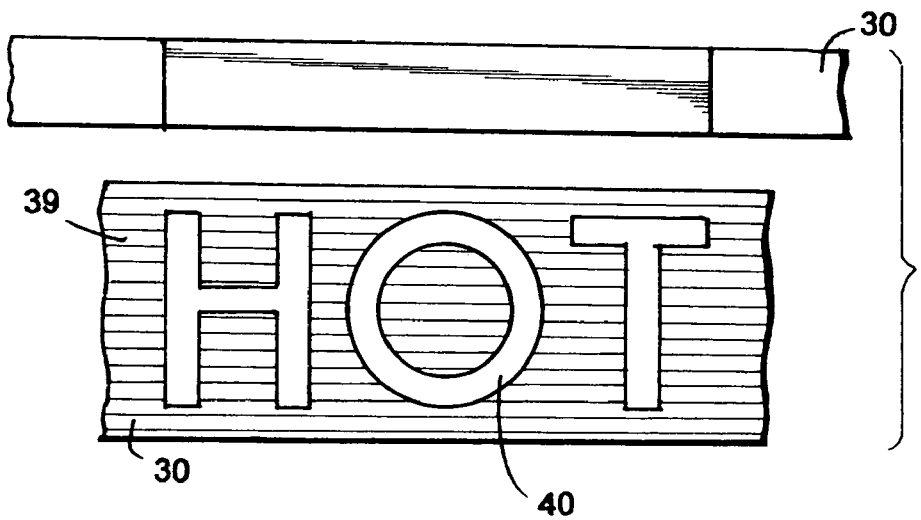
FIG. 3 shows side and top views of an alternative embodiment of the heat warning safety device of the present invention where the warning symbol is on the side of the protective sheathing of the fiber optic cable.
Figure 4:
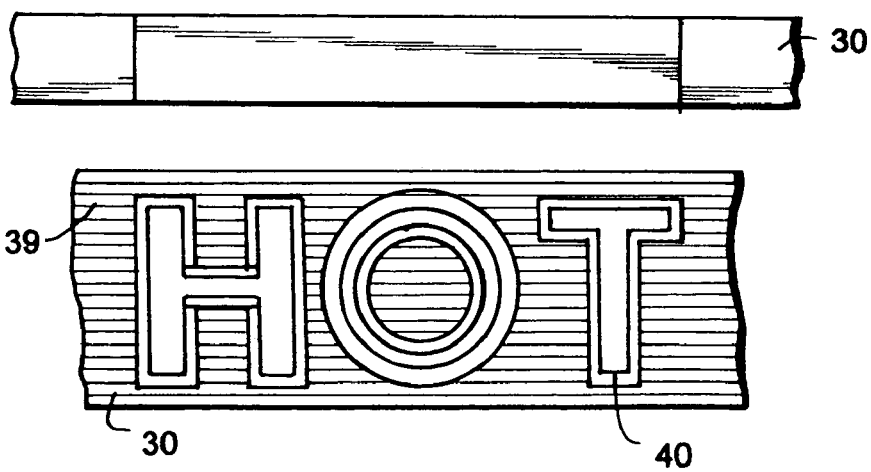
FIG. 4 shows side and top views of a further alternative embodiment of the heat warning safety device of the present invention where the warning symbol is on the side of the protective sheathing of the fiber optic cable.

In general, heat symbol 40 may be outside cable 30 or may be on protective sheathing 39 of cable 30 or on a thin coating over at least a portion of protective sheathing 39 of cable 30. In the latter cases, the symbol 40 may be formed from a cut-out portion of the protective sheathing or the coating on the protective sheathing. For example, translucent cable protective sheathing 39 may be covered with a black coating other than at discrete cut-out letter shapes spelling out the symbol, for example "H,O,T" as shown in FIG. 3. Alternatively, as seen in FIG. 4, the protective sheathing 39 can be coated at only the area of the symbol 40 and the symbol 40 would be marked out using a double-lined lettering to form an outline of the symbol 40. It should be clear that FIGS. 3–10B are not intended to depict the entirety of device 10. For example, heat sensors 65 are not shown in these drawing figures.

Symbol 40 may also be in the form of a sticker that is applied to a surface of the cable 30 but that can be removed and moved to a near by surface of cable 30. The sticker would be illuminated by the light from the fiber optic cable 30. This removability allows it to be customized for the height and for the language of the user/worker in the industrial setting. Of course, the symbol 40 can be in any color.

Figure 7:
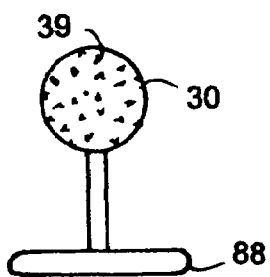
FIG. 7 is an end view of an alternative embodiment of the device of the present invention wherein a display plane carrying the heat warning symbol is attached to a side of the cable.
Figure 8:
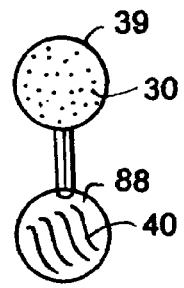
FIG. 8 is an end view of a second version of an alternative embodiment of the device of the present invention wherein a display plane carrying the heat warning symbol is attached to a side of the cable.

As shown in FIGS. 7 and 8, the device of the present invention contemplates having the light shine through the side of the cable 30 onto a display plane 88, which display plane 88 carries the heat warning symbol 40. Display plane 88 may be attached to a side of the cable 30 in any conceivable way and two such ways are depicted in FIGS. 7–8. In FIG. 8, display plane 88 may be at any angle with respect to cable 30.

As shown in FIG. 10A, the idea of the coating and the cut-out can be combined with the idea of the cable 30 itself being in the shape of the symbol 40. As seen in FIG. 10A, the darkened area 29 of the cable 30 is the entire cable 30 other than the portion of the cable 30 that are shaped in the letters of the symbol 40. The darkening is typically effectuated by coating the otherwise translucent cable protective sheathing 39 with a well-known suitable substance such as paint, resin, etc.

Image Transfer Embodiment

Figure 5A:
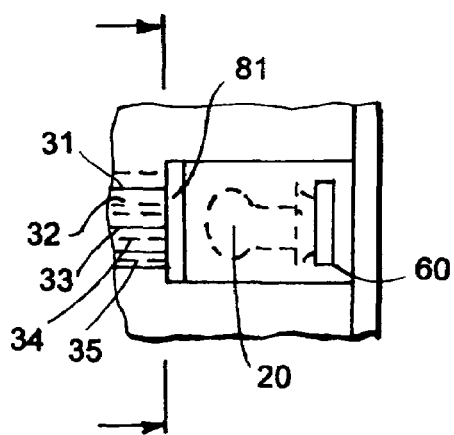
FIG. 5A is a fragmentary side view of an alternative embodiment where the fiber optic cable transfers an image of a heat warning symbol which includes the light traversing medium.
Figure 5B:
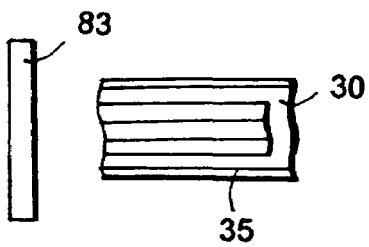
FIG. 5B is a fragmentary side view of the embodiment shown in FIG. 5A which includes the light receiving medium.

In certain embodiments, heat warning symbol 40 need not be always at a fixed location but rather may be placed there whenever cable 30 is illuminated. In accordance with this preferred embodiment and as best shown in FIGS. 5A and 5B, the fiber optic cable 30 of the present invention can be used to perform a transfer of an image of the heat warning symbol 40 to a point outside the cable, or in certain embodiments even to a point on the surface of the cable 30, the image being readable by the observer who also sees the surface and needs to know when it is hot. Thus, in this embodiment, a first light-traversing medium 81 containing the predetermined warning symbol is fixedly placed between the light source 20 and a first end 36 of fiber optic cable 30. In addition, a light receiving medium is positioned facing a second end 38 of fiber optic cable 30. Light receiving medium 83 may be directly adjacent second end 38 of cable 30 or may more than approximately one foot away, or may at a much greater distance than a foot.

As a result of the light being transmitted through light traversing medium 81 containing an expression of symbol 40, an image of the predetermined warning symbol 40 is transmitted through the plurality of fibers 31, 32, 33, 34, 35, etc. and is received and fixed on the light receiving medium 83 which is facing the second end 38 of the cable 30. Light traversing medium 81 may be in the form a plane perpendicular to the direction of the light going from the light source 20 to the first end 36 of cable 30, the cable containing a fixed expression or shape of the symbol. It is further necessary that light traversing medium 81 form the shape of the symbol adjacent a discrete collection of the first ends of particular fibers within cable 30. Thus only those fibers in cable 30 that are adjacent the shaped symbol transmit the light and thus an image of this symbol is transmitted through the cable 30. Light traversing medium may include a color filter that causes the light traveling through cable 30 to shine in a particular color.

In this patent application the term "light traversing medium" refers to a medium through which light can travel, typically a translucent object. Alternatively it can refer to an object that is transparent other than at points where the heat warning symbol is located.

In certain embodiments having multiple light sources, 20, the light traversing medium 81 may be positioned between a light source 20x and first end 36 of cable 30.

Figure 9:
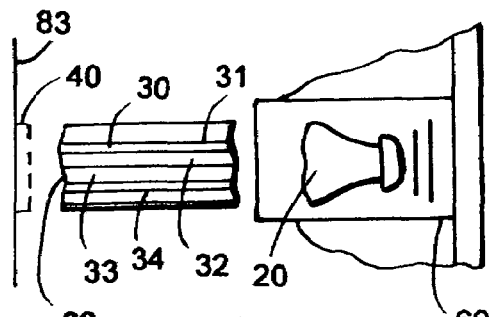
FIG. 9 is a fragmentary side view of an embodiment of the device of the present invention wherein the cable illuminates a heat warning symbol facing a second end of the fiber optic cable.

Furthermore, as shown in FIG. 9, the present invention can use cable 30 to transmit light to illuminate symbol 40 rather than transfer an image of symbol 40 and still make use of a light receiving medium 83 facing second end 38 of cable 30. In that case, there would be no light traversing medium 81. This is shown in FIG. 9. In that case, symbol 40 is a physical entity such as lettering or a sticker or anything else that depicts symbol 40 and thus symbol 40 has physical thickness. In contrast, in FIG. 5B, which depicts the end portion of the embodiment involving the transfer of the image of symbol 40 first through light traversing medium 81, through cable 30 and finally to light receiving medium 83, light receiving medium 83 receives and displays symbol 40 but said symbol 40 has no more thickness than the image on a screen and hence is not visible on FIG. 5B.

Light receiving medium 83 can be anything that captures and displays the symbol 40, such as a small screen. Light receiving medium 83 can also be the actual surface of the object that you are warning about. Thus, an area on the hot surface of a metal object that an industrial worker is concerned about can be flashed, that is instantly illuminated, with the heat warning symbol "HOT" when it gets too hot to touch. Furthermore, if that surface moves but still needs to be monitored for heat, or if a different surface needs to be monitored for heat, the second end 38 of flexible cable 30 can simply be re-directed by the user/worker (or in certain embodiments by an automatic mechanism) so that it points to the desired new surface or the moved surface and then the new or moved surface will be instantly illuminated, or flashed, with heat warning symbol 40 when that surface exceeds the specified temperature. Generally, in order to maintain the advantages of the "image transfer" embodiment, it is helpful if the light receiving medium be made of metal or another material that is insensitive to very high temperatures (for example up to 2000 degrees Fahrenheit), such as high tech ceramic/glass.

One of the important advantages of the "image transfer" embodiment of the present invention further enhances the ability of the apparatus of the present invention to be used in temperature sensitive situations. As it is, by using fiber optic cables rather than electric cables, the device 10 of the present invention offers the advantage of being able to transmit the warning message in high temperature environments since fiber optic cables can withstand much higher temperatures than electric wires or thermochromic compositions. For example, in a gas stove where the heating element is fed by gas inlet lines 70 fiber optic cable 30 can even run through the gas inlet lines 70 since fiber optic cables are not combustible and are not carrying electricity and fiber optic cables are known to withstand temperature of 1200 degrees Fahrenheit (Alternatively, the fiber optic cable 30 can run alongside gas inlet lines 70). Another example is a factory worker working near a very hot liquid in a drum, a worker near a kiln which could experience temperatures of up to 2700 degrees F., or a worker performing smelting or operating with machinery or in any industrial refinery. Now, this advantage is further multiplied in that even the fiber optic cable 30 can be distanced from a dangerous heat source. Thus, the entire cable 30 can be distanced greatly from a potentially dangerously hot surface and the warning symbol 40 can be right near that dangerously hot surface.

Another advantage of "image transfer" using fiber optic cables is the fact that the symbol can be read directly off the surface that is hot. That is, the light receiving medium 83 is directly on the potentially hot surface. Normally, a heat warning device cannot be on the hot surface itself because that surface is too hot. However, when the symbol is merely being thrown onto the surface in the form of a light image, there is no danger in having the symbol directly on the hot surface. This is a vast improvement in settings where the hot surface (i) is susceptible to become hotter than even the maximum temperatures that fiber optic cables can tolerate and (ii) must be observed continuously or often by an industrial worker who cannot afford to divert his attention to a different even nearby surface containing a heat warning symbol or device.

It should be noted that although FIG. 1 appears to show the fiber optic cables running in a straight line for only a short distance, no length is to be deduced from this drawing figure. In certain embodiments the fiber optic cable 30 can be shaped in a straight line for a few feet or more measured from first end 36 of cable 30. In certain embodiments, the cable 30 is maintained in a straight line shape for a few feet deliberately since light does not respond well to bending and since fiber optic cables work best when they allow the light to first have a short straight run. It is noted, however, that as long as the cables are not bent at hard right angles, and preferably not more than eight times the diameter of the cable, the fiber optic cables can be bent and can be bent without even creating a lighting hot spot.

Alternatively, measured from the first end 36 of fiber optic cable 30 (near light source 20) the cable 30 is in a straight line for some distance less than a few feet, for example one foot, and this is sufficient in this case since the quantity of illumination needed to shine on the heat warning symbol at the end of the cables is quite small. It is estimated to be well below 25 watts. Furthermore, the light source can be a halogen bulb or other appropriate light source and the power of this light source can be increased to obtain the desired intensity of illumination at the second end of the fiber optic cables taking into consideration the fact that the cables have an initial straight run coming out of the light source of fewer than a few feet. Alternatively, or in addition if necessary, other steps can be taken such as increasing the diameter of the fiber optic cable, placing a fish eye lens or a hemispheric reflector at the second end of the fiber optic cable to increase the illumination of the light on the heat warning symbol. If possible, a reflector can also be put behind the light source. Alternatively, light source 20 can be a reflector spot bulb.

In another feature of the present invention, device 10 also allows the brightness of the heat warning symbol 40 to be adjusted either depending upon the individuals who are likely to need the warning that the surface may be dangerously hot and/or depending upon the degree of heat that the surface exhibits. The symbol 40 could also be made to blink on or off and the frequency of this blinking could also be made to be proportional to the degree of heat exhibited by the surface of the object. Controller 60 would adjust light source 20 in the same manner that controller does the turning on of light source 20 using well known means and based on a setting chosen by the user. The setting would appear on switch 90 or with a separate switch.

Another feature of the present invention is that a sound producing component 24 can produce a sound warning whenever the light source is on. This is not just advantageous to visually impaired individuals. For all individuals, it compounds the effect of the warning. To achieve this objection, one need only have to have a sound producing device 77 that is connected to the controller 60. Obviously, the nature, length, volume and other characteristics of the sound alarm can also be adjustable and can be controlled by software. The sound can be made proportional to the degree of heat on the surface of the object. The sound can come in a microchip that plays a prerecorded message saying "warning, this area is hot".

The advantage of these additional features is seen from the following example. Consider a single young male who lives alone. He may typically maintain the brightness level at a low level at all times. This is because he sees well and is not distracted and also because when he entertains he does not want to unnecessarily visually clutter or detract from the appealing appearance of his smooth cooktop. When he gets married, his wife is protective and turns up the brightness of the device 10 to protect the children who she is fearful may not see a low level warning device 10. When their elderly parents come to visit they turn up the power of the light source further and put the sound feature on.

It should be understood that the present invention contemplates generally that the above described embodiments may be combined to produce other embodiments not explicitly described herein. Purely by way of illustration, the alternative embodiment shown in FIG. 10A wherein the lettering of symbol 40 forms a portion of the cable 30 may be combined with the blinking and sound embodiment or with the embodiment wherein the symbol 40 is outside cable 30 to provide more than one symbol, one on the shape of the cable 30 itself and one clipped onto a small display plane that is attached to a side of cable.

The term "excessively hot" as used in the claims herein means dangerously hot or otherwise too hot for the purposes of the user of the object, surface or system. Similarly, the term "excessively cold" means dangerously cold or otherwise too cold for the purposes of the user of the object, system or surface. The term "temperature excessive" as used herein shall mean having an excessive temperature, whether it be excessively hot or excessively cold. An area having a dangerous amount of vibrations means an area in which the amount of vibrations is such that it would militate against using electric wires or LEDs in the area.

In a further embodiment of the device of the present invention, the present vention can be used to create a "ticker-tape" similar to the moving words shown on news wires on the outside of a building. The word shown would be the hot warning symbol, for example "HOT". Instead of having a massive amount of bulbs that a computer sequences on and off to create the illusion of movement, controller 60 determines an on/off sequence for a plurality of fiber optic cables, each one having its second end on the surface that is moving.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A heat alert safety device for warning individuals that a surface of an object is temperature excessive, comprising
    a light source that generates a light beam,
    a light guide, said light guide connected at a first end of said light guide to the light source and oriented so that the light guide is directly in a path of the light beam, said light guide transmitting the light beam from the light source beginning from the first end to the second end of said light guide, the second end of said light guide shining the light beam out of the light guide,
    a predetermined symbol adjacent the second end of the light guide, the symbol readily visible only when illuminated to an observer who can also readily see the surface, said symbol communicating that the surface is temperature excessive,
    a controller controlling the light source so that whenever a specified surface temperature is reached, the symbol is illuminated and remains illuminated as long as said specified surface temperature is maintained, and
    heat sensor adjacent the surface and connected to the controller for ascertaining a surface temperature and communicating the surface temperature to the controller.

2. The device of claim 1, wherein the light source is located on the object.

3. The device of claim 2, wherein the object is a stove and the light source is located immediately beneath a portion of a top surface of the stove and wherein said light source is at a maximum surface distance from the heating elements of the stove.

4. The device of claim 1, wherein the object is a gas stove and the surface is a surface of a heating element on the gas stove, wherein the symbol is positioned in a center of the heating element and wherein the second end of the light guide is positioned beneath the heating element.

5. The device of claim 4, wherein the heating element is fed by gas inlet lines and wherein the light guide runs through the gas inlet lines.

6. The device of claim 4, wherein the heating element is fed by gas inlet lines and wherein the light guide runs alongside the gas inlet lines.

7. The device of claim 4, wherein the heating element is a metal grate having an open area in the center of the metal grates.

8. The device of claim 1, wherein the object is an electric stove and the surface is a surface of a heating element on an electric stove, wherein the symbol is positioned in a center of the heating element and wherein the second end of the light guide is positioned beneath an area of the heating element.

9. The device of claim 8, wherein the heating element is a serpentine electric coil having a disk in the center and wherein the symbol is positioned on the disk.

10. The device of claim 1, wherein the object is a smooth cooktop stove and the surface is a surface is of a heating element of the smooth cooktop stove, wherein the symbol is positioned in a center of the heating element and wherein the second end of the light guide is positioned beneath an area of the hearing element.

11. The device of claim 10, wherein the heating element is a smooth area of glass or metal on a top surface of the stove that absorbs heat from a heat source directly underneath said smooth area of glass or metal.

12. The device of claim 1, wherein the object is a smooth cooktop stove and the surface is a surface is of a heating element of the smooth cooktop stove, wherein the symbol is positioned surrounding the heating element and wherein the second end of the light guide is positioned beneath an area of the heating element.

13. The device of claim 12, wherein the heating element is a smooth area of glass or metal on a top surface of the stove that absorbs heat from a heat source directly underneath said smooth area of glass or metal.

14. The device of claim 1, wherein said device also includes a switch for turning the device on or off.

15. The device of claim 1, wherein a device indicator notifies the user whether the device is functional.

16. The device of claim 1, wherein a degree of brightness of the light source is controlled by the controller based on a setting set by a user.

17. The device of claim 1, wherein a sound producing component controlled by the controller produces a sound alarm whenever the light source is turned on.

* * * * *